United States Patent [19]

Bond

[11] 4,400,985

[45] Aug. 30, 1983

[54] STRAIGHT LINE LINK MECHANISM

[76] Inventor: Irvin D. Bond, 10270 Allen Rd., Clarkston, Mich. 48016

[21] Appl. No.: 256,390

[22] Filed: Apr. 22, 1981

[51] Int. Cl.³ .............................................. F16H 21/04
[52] U.S. Cl. ...................................... 74/103; 74/110; 414/752
[58] Field of Search ................. 74/103, 110, 104, 105, 74/107; 414/751, 752; 173/38

[56] References Cited

U.S. PATENT DOCUMENTS

| | | | |
|---|---|---|---|
| 893,068 | 7/1908 | Gay | 74/110 |
| 2,414,072 | 1/1947 | Taft | 173/38 |
| 2,521,895 | 9/1950 | Bunting | 173/38 |
| 3,262,594 | 7/1966 | Teago | 414/72 |
| 3,870,109 | 3/1975 | Gay | 173/38 |

*Primary Examiner*—William F. Pate, III
*Attorney, Agent, or Firm*—Charles Chandler

[57] ABSTRACT

A linear motion mechanism in which a series of pivotally connected links are connected between a support and a controlled member such that as one of the links is swung in a 360° arc, the controlled member alternately moves in a first direction along a linear path of motion and then in the opposite direction along a curved path of motion.

In another embodiment of the invention, the weight of the controlled member is balanced by a counter weight connected to the linkage to provide a lifting mechanism.

Another embodiment employs a cam to produce a motion in which the controlled member moves in a horizontal path with a short vertical motion at each end of the horizontal motion.

15 Claims, 11 Drawing Figures

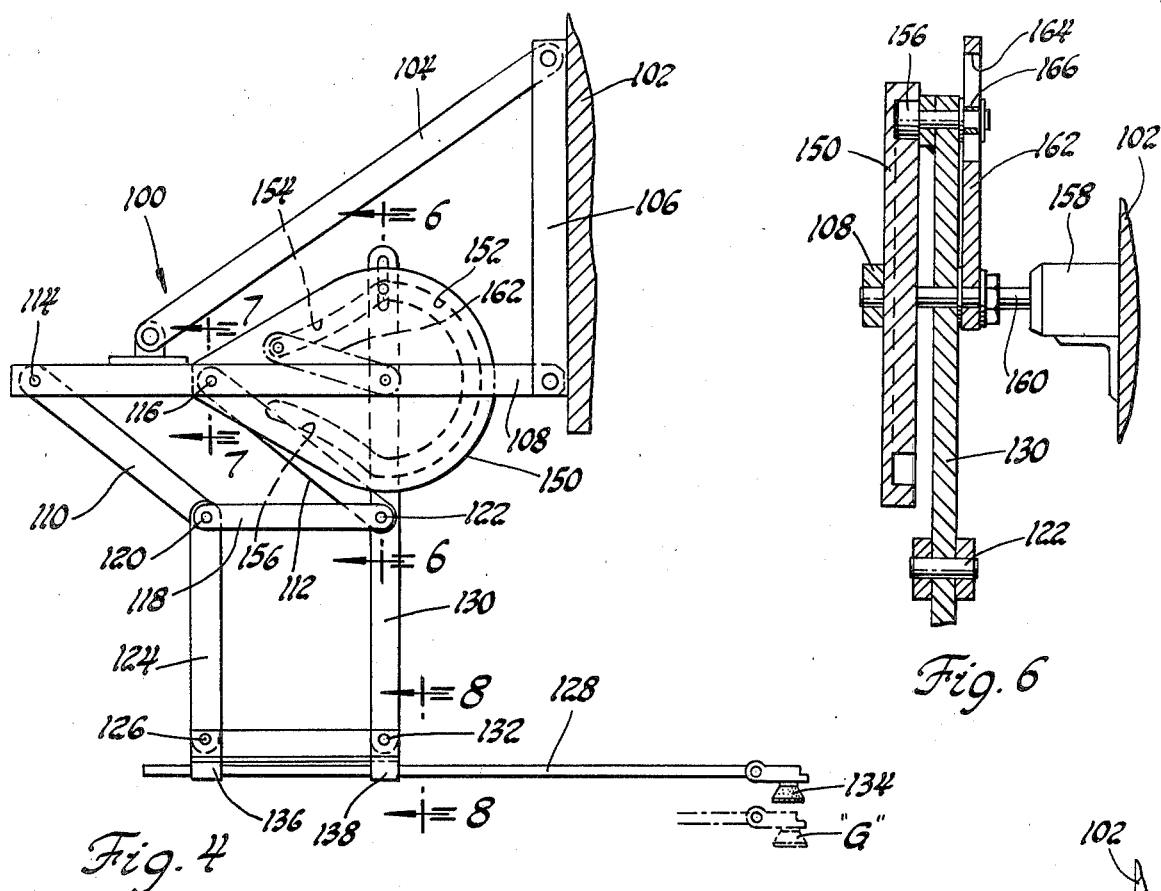

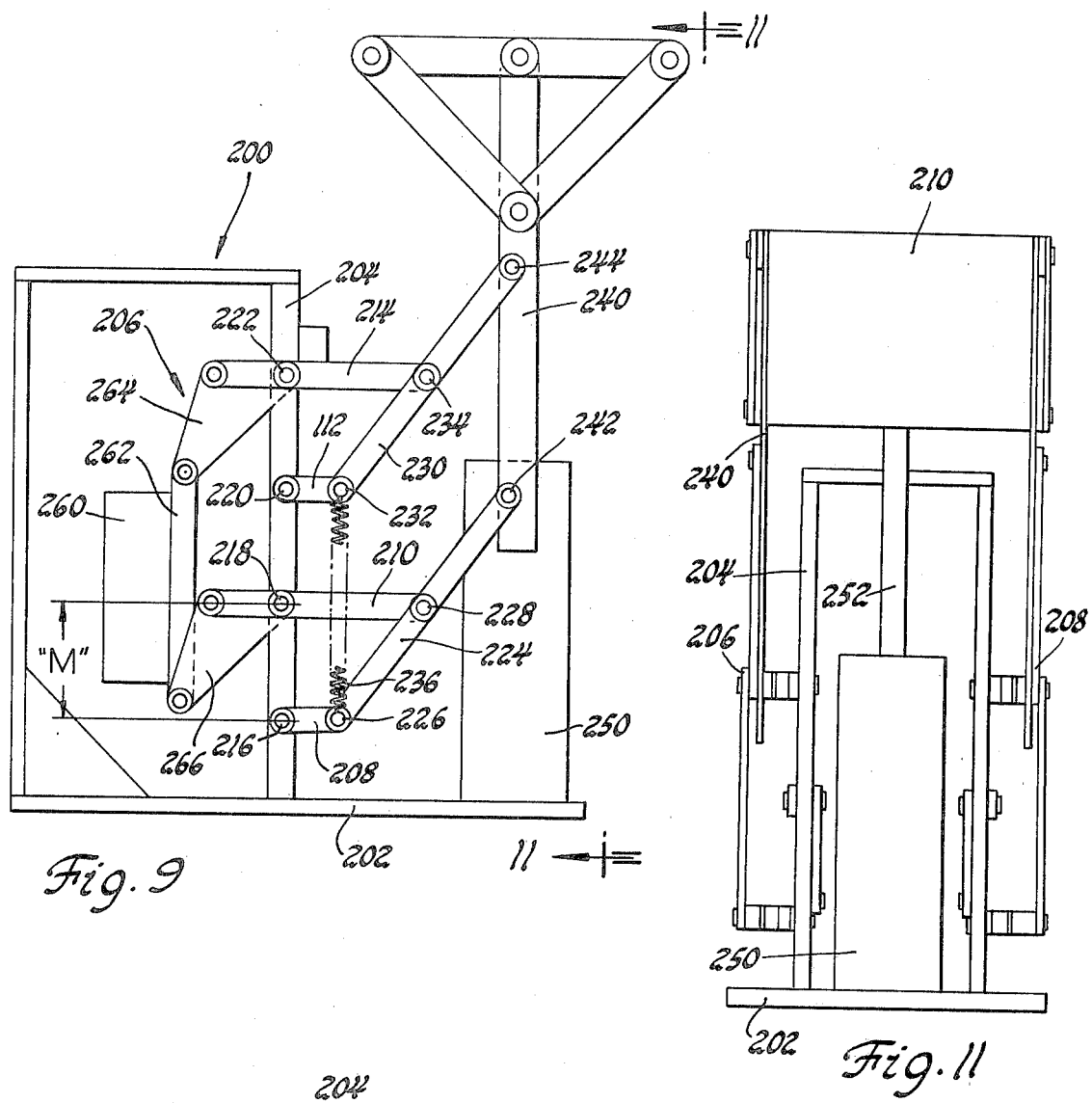
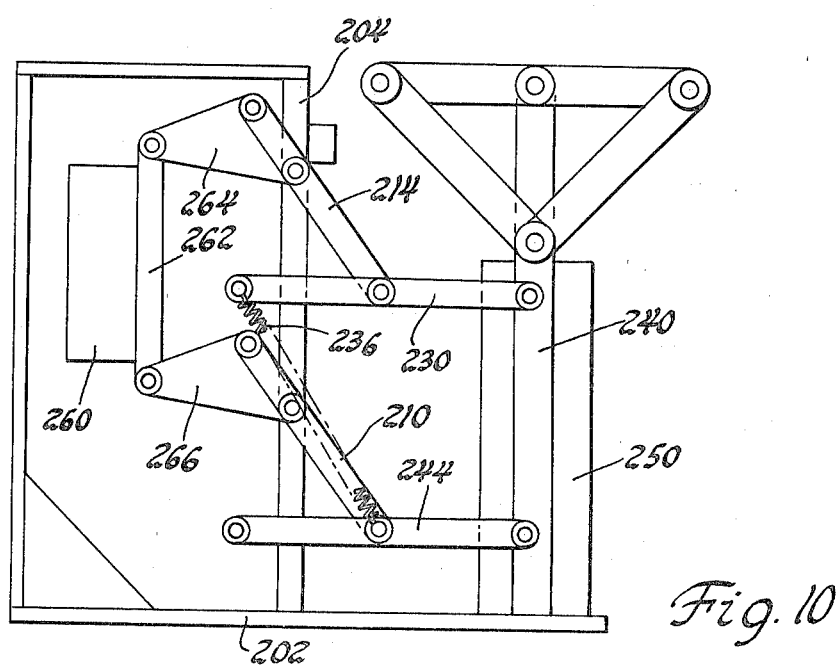

STRAIGHT LINE LINK MECHANISM

BACKGROUND OF THE INVENTION

This invention is related to linkage mechanisms for moving a controlled member along a substantially linear path of motion, and more particularly to a linkage adapted to move a controlled member in a linear motion as one of the links is being rotated.

Some industrial applications require a workpiece or other elongated member to be moved along a linear path in a reciprocal motion. For example, a stamping blank must be delivered to a die, and then removed from the die. Conventionally, the work transfer means employ a variety of mechanisms, such as a rack and pinion to achieve the linear motion.

SUMMARY OF THE INVENTION

The broad purpose of the present invention is to provide a linkage mechanism having a pair of links pivotally connected to a controlled member for moving it along a linear path of motion as one of the links is pivoted by an appropriate power means. In one embodiment of the invention, a pair of linkage means are mounted in tandem and so connected that as one of the links is driven in a portion of an arc, the controlled member moves along a linear path. By reversing the motion of the drive link, the controlled member is moved in the opposite direction. The mechanism can be adapted so that by rotating one of the links in a 360° path of motion the controlled member is first moved in a linear path and then moved in the opposite direction in a curved path.

The preferred linkage mechanism can be employed in a variety of useful applications. For example, an overhead system can be suspended for moving the controlled member along a linear horizontal path beneath the support. In another embodiment, the controlled member is connected to a cam to provide a lifting motion at each end of the horizontal motion. In still another form of the invention, the controlled member is balanced by a counter weight and supported for a lifting motion.

In each form of the invention, the mechanical components provide a lightweight system having a lesser inertia and less friction than other forms of mechanical mechanisms.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 4 illustrates another embodiment of the invention mounted on an overhead structure;

FIG. 5 is a view similar to FIG. 4 but with the controlled member disposed at the opposite end of its horizontal transfer path;

FIG. 6 is an enlarged view as seen along lines 6—6 of FIG. 4;

FIG. 7 is an enlarged view taken along lines 7—7 of FIG. 4;

FIG. 8 is an enlarged view taken along lines 8—8 of FIG. 4;

FIG. 9 is another embodiment of the invention incorporated in a counter-balanced lifting device;

FIG. 10 is a view similar to FIG. 9, but in which the lifting device is in the raised position; and FIG. 11 is a view as seen along lines 11—11 of FIG. 9.

DESCRIPTION OF THE PREFERRED EMBODIMENTS

Figure 1:
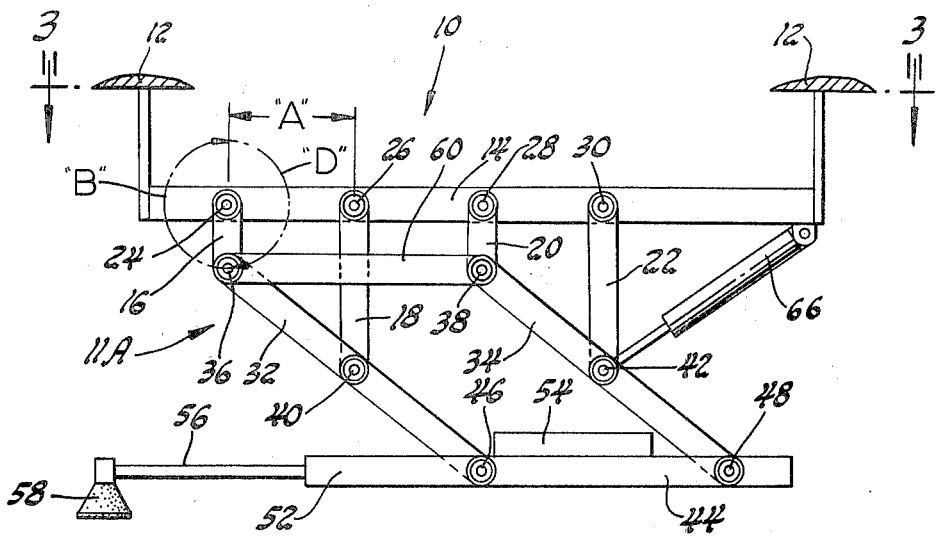
FIG. 1 is an elevational view showing the preferred embodiment in one position.
Figure 2:
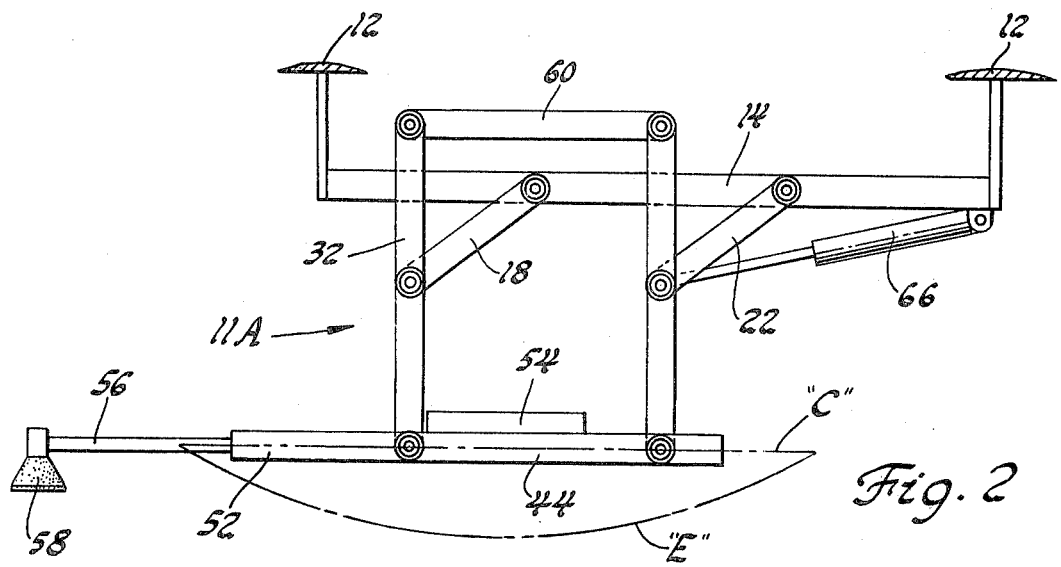
FIG. 2 is a view similar to FIG. 1, but with the controlled member advanced along its path of linear motion.

Referring to the drawings, a preferred linkage mechanism generally illustrated at 10 is attached to ceiling 12 by means of a support 14. Mechanism 10 includes a near side linkage means 11A and a far-side linkage means 11B.

Four links 16, 18, 20, and 22 each have an upper end connected by pivot means 24, 26, 28, and 30, respectively, to support 14. The distance between pivot means 24 and 26 is a predetermined distance "A". The distance between pivot means 26 and 28 and between pivot means 28 and 30 is also "A". Links 16 and 20 are equal in length as are links 18 and 22. Links 32 and 34 are connected to the lower ends of links 16, 18, 20, and 22.

Pivot means 36 connect link 32 to link 16 such that the distance between pivot means 24 and 36 is equal to one half "A". Pivot means 38 connect link 34 to link 20 such that the distance between pivot means 28 and 38 is one half "A". Pivot means 40 connect link 32 to link 18 such that the distance between pivot means 26 and 40 is equal to 1.25 A. The distance between pivot means 36 and 40 is also equal to 1.25 A. Pivot means 42 connect link 34 to link 22 such that the distance between pivot means 30 and 42 is equal to 1.25 A, and the distance between pivot means 38 and 42 is also equal to 1.25 A.

Controlled means 44 is connected to the lower end of links 32 and 34. Pivot means 46 connect controlled means 44 to link 32 a distance equal to 1.25 A from pivot means 40. Similarly, pivot means 48 connect controlled means 44 to link 34 a distance from pivot means 42 equal to 1.25 A.

Controlled means 44 includes an arm 52 connected to links 32 and 34, and lower support member 54 which has one side connected to arm 52 and its opposite side connected to a companion arm on linkage means 11B. A member 56 carries a pick-up device 58 that is to be moved along a linear path.

An arm 60 is also connected by pivot means 36 and 38 to links 16 and 20.

Figure 3:
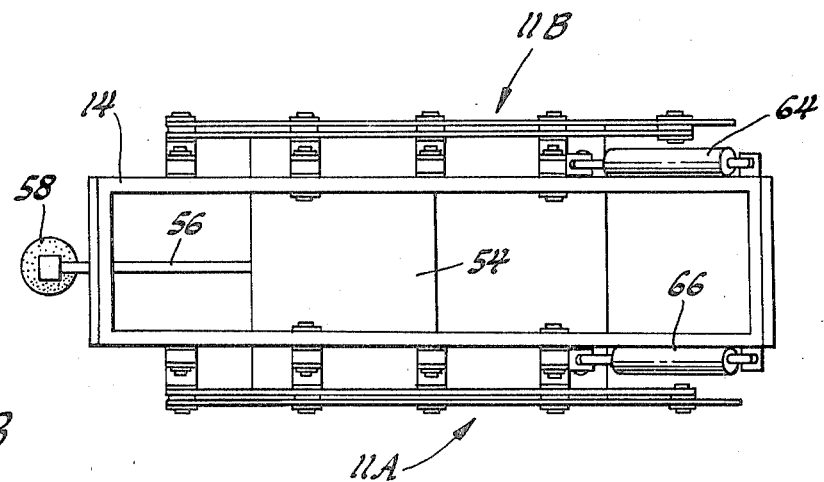
FIG. 3 is a view seen along lines 3—3 of FIG. 1.

Referring to FIG. 3, linkage means 11B, similar to linkage means 11A, is mounted on the opposite side of support 14 as mechanism 10, and has a companion link mounted abreast of each of the links of means 11A. The lower end of linkage means 11B is connected to controlled means 44 to stabilize pick-up device 58.

The arrangement is such that as link 16 is rotated in the counter-clockwise direction through a 180° arc "B", as illustrated in FIG. 1, the controlled means moves along a linear path illustrated in phantom at "C", from right to left. If link 16 is reversed along its path of motion, controlled means 44 then moves along the same linear path "C," but in the opposite direction. If link 16 continues to move along another 180° path illustrated at "D," the controlled means 44 moves in the opposite direction along a curved path "E".

Any part of this controlled motion can be applied in a useful application. For illustrative purposes, a pair of actuators 64 and 66 are connected between support 14 and the two linkage means to alternately push and then pull the mechanism in a pivotal motion and accordingly move the pick-up device in a linear path toward the left and then in the opposite direction along the same linear path, toward the right.

FIGS. 4 to 8 illustrate another embodiment of the invention in mechanism 100. This form of the invention is mounted on overhead structure 102 and comprises a three-sided frame formed of arms 104, 106, and 108. Linkage mechanism 100 has a pair of links 110 and 112 each having their upper ends connected by pivot means 114 and 116, respectively, to horizontal arm 108. Pivot means 114 and 116 are separated a distance "F" as illustrated in FIG. 5.

A link 118 is pivotally connected by pivot means 120 and 122 to the lower ends of links 110 and 112 in such a manner that links 110 and 112 are movable in a parallel relationship. The distance between pivot means 114 and 116 equals the distance between pivot means 120 and 122, while the distance between pivot means 114 and 120 and the distance between pivot means 116 and 122 is "F".

Another link 124 has its upper end connected by pivot means 120 to both links 110 and 118. The lower end of link 124 is connected by pivot means 126 to a horizontal arm 128.

A link 130 has its midsection connected by pivot means 122 to both links 112 and 118, and its lower end connected by pivot means 132 to arm 128. The distance between pivot means 126 and 132 is equal to the distance between pivot means 120 and 122 while the distance between pivot means 120 and 126 is equal to the distance between pivot means 122 and 132.

A pick-up device 134 is carried on the outer end of arm 128.

Clevis means 136 and 138 connect arm 128 to pivot means 132 as best illustrated in FIG. 8.

FIG. 7 illustrates the manner in which a typical link 112 is connected by pivot means 116 to arm 108. Pivot means 116 includes a short shaft 140 connected by bearing means 142 with retainer means 144 and 146 retaining the assembly in position.

Referring to FIG. 6, a cam plate 150 is mounted on arm 108. Cam plate 150 has a C-shaped groove cam 152 which extends in an arc of about 180°. The upper end of groove 152 terminates in a short groove 154 which slants downward and toward the left. The bottom half of cam groove 152 terminates in a short groove 156 that extends upwardly toward the left.

A cam roller 156 is carried on the upper end of link 130 and rides in grooves 152, 154, and 156.

Motor means 158 has a shaft 160 carrying a drive link 162 for rotation. The upper end of link 162 has a longitudinal slot 164 which carries roller means 166 which is received in slot 164. Roller means 166 is carried on the opposite end of pin 167 that carries cam roller 156. Slot 164 is chosen such that when cam 156 is in slot 152, roller 166 engages the bottom of slot 164, as illustrated in FIG. 6. As link 162 is rotated, it pushes roller 156 in either the counter-clockwise or clockwise direction in cam groove 152 depending upon the direction of rotation. The roller is then received into either slot 154 or slot 156. When the rotation of the motor is reversed, the roller moves toward groove 152 to thereby move roller 166 in the opposite direction in slot 164. The arrangement is such that the distance from shaft 160 to the position in which cam 166 is in the bottom of cam slot 164 is bout one half "F".

The arrangement is such that as drive link 162 is rotated, controlled arm 128 moves in a horizontal transfer path between an extreme position illustrated in FIG. 4 and an opposite extreme position illustrated in FIG. 5. At the end of the horizontal transfer motion, as cam 156 moves into groove 156, the pick-up device 134 is lowered a predetermined vertical distance. When the drive link rotation is reversed, the pick-up device 134 is then raised to its former horizontal position. Arm 120 is then horizontally moved to the opposite extreme position, illustrated in FIG. 4, until the cam roller is at the top of groove 152. As the link continues its rotation, the pick-up device is then lowered to a position illustrated at "G" in FIG. 1, thus the pick-up device is moved in motion ranges between position "G" and position "H" as illustrated in FIG. 5.

Another embodiment of the invention is illustrated in FIGS. 9 to 11 in the form of lifting means 200. Lifting means 200 comprises a base 202 having an upright supporting frame 204.

A pair of linkage means 206 and 208 are mounted on opposite sides of frame 204 for raising and lowering a lifted member 210. Linkage means 206 and 208 are identical to one another except for a right and left hand relationship so that a discussion of linkage means 206 also applies to the corresponding members of linkage means 208.

Referring to FIGS. 9 and 10, linkage means 206 includes links 208, 210, 212, and 214 pivotally connected by pivot means 216, 218, 220, and 222, respectively. The distance between pivot means 216 and 218 is referred to as distance "M". The distance between pivot means 218 and 220 between 220 and 222 also equals "M".

A link 224 is connected by pivot means 226 and 228 to links 208 and 210, respectively. The distance between pivot means 218 and 228 is about 1.25 times "M". The distance between pivot means 216 and 226 is about one half "M".

A link 230 has one end connected by pivot means 232 to link 112 and its midsection connected by pivot means 234 to the outer end of link 214 in the same manner that link 224 is connected to links 208 and 210.

A spring member 236 has its ends connected to pivot means 226 and 232, respectively. Return spring 236 functions to prevent a condition in the linkage system when there is a minimal amount of torque tending to turn the links in the system.

A vertical arm 240 is connected to the outer end of links 224 and 230 by pivot means 242 and 244, respectively, in such a manner that vertical arm 240 is vertically movable. The upper end of arm 240 is connected to lifted member 210, as illustrated in FIG. 11. Similarly, linkage means 208 is mounted on the opposite end of frame 204 and connected to the opposite side of lifted member 210. A reciprocating actuator 250 is mounted on base 202 and has a reciprocating piston arm 252 connected to lifted member 210 for raising and lower it between its lowered position illustrated in FIG. 10 and its upper position illustrated in FIG. 9. A counter-balance weight 260 is carried on an arm 262 having its upper end pivotally connected by arm 264 to link 214, and its lower end pivotally connected by arm 266 to link 210. The arrangement is such that a lifted member 210 is raised, counter weight 260 balances a portion of the weight of member 210 so that it takes a minimal amount of energy for actuator 250 to raise and lower lifted member 210. The particular relationship between the links of the respective links permit the lifted member 210 to move in a substantially linear vertical position as the links are being pivoted, and provides a relatively lightweight means for connecting counter-weight 216 to the lifted member.

Having described my invention, I claim:

1. A straight line link mechanism, comprising:
    a support;
    a first link;
    first pivot means connecting the first link to the support for pivotal motion;
    a second link;
    second pivot means connecting the second link to the support for pivotal motion, the second pivot means being disposed a first distance from the first pivot means;
    a third link;
    third pivot means connecting the third link to the first link for relative pivotal motion a distance from the first pivot means of about one half said first distance;
    fourth pivot means connecting the third link for relative pivotal motion to the second link a distance from said second pivot means of about 1.25 times said first distance;
    said fourth pivot means being connected to the third link a distance from the third pivot means of about 1.25 times said first distance;
    a controlled member, and means pivotally connecting the controlled member to the third link a distance of about 1.25 times said first distance from the fourth pivot means;
    a forth link;
    fifth pivot means connecting the fourth link to the support for pivotal motion, the fifth pivot means being disposed said first distance from the second pivot means;
    a fifth link;
    sixth pivot means connecting the fifth link to the support for relative pivotal motion, the sixth pivot means being disposed said first distance from the fifth pivot means;
    a sixth link;
    seventh pivot means connecting the sixth link to the fourth link a distance from the fifth pivot means of about one half said first distance such that the sixth link is movable in parallel relationship with the third link;
    eighth pivot means connecting the sixth link for relative pivotal motion to the fifth link a distance of about 1.25 times said first distance from said sixth pivot means, said eighth pivot means being connected to the sixth link a distance of about 1.25 times said first distance from the seventh pivot means such that the eighth link is movable in parallel motion with the third link;
    means pivotally connecting the sixth link to the control member a distance of about 1.25 times said first distance from the eighth pivot means; and
    power means connected to one of said links such that as the first link is moved in a pivotal motion with respect to the support, the controlled member is moved along a substantially linear path of motion.

2. A mechanism as defined in claim 1, in which the controlled member is moved along a linear path in the opposite direction as the first link is pivotal in the opposite direction.

3. A mechanism as defined in claim 1, in which the controlled member is moved in a first direction and then in the opposite direction as the first link is being pivoted.

4. A mechanism as defined in claim 1, in which the controlled member is moved in a linear path in a first direction and then in a curved path in the opposite direction as the first link is being pivoted in a single direction of motion.

5. A mechanism as defined in claim 1, in which the controlled member moves in a first direction along said linear path and then in the opposite direction along the linear path as the first link is being pivoted in a single direction of motion.

6. A mechanism as defined in claim 1, in which the controlled member is moved along a substantially horizontal path of motion as the first link is being pivoted.

7. A mechanism as defined in claim 1, in which the controlled member is moved in a vertical motion as the first link is being pivoted, and including a counter weight connected to one of said links so as to balance the weight of the controlled member.

8. A mechanism as defined in claim 1, in which the power means is connected to the controlled member.

9. A mechanism as defined in claim 8, in which the power means is operative to either raise or lower the controlled member.

10. A mechanism as defined in claim 1, in which the fourth, fifth, and sixth links are connected in tandem with respect to the first, second, and third links.

11. A mechanism as defined in claim 1, in which the fourth, fifth, and sixth links are connected abreast the first, second and third links.

12. A mechanism as defined in claim 1, including a seventh link pivotally connected to said first link and said fourth link so as to be movable therewith.

13. A straight-line linkage mechanism, comprising:
    a support;
    a first link;
    first pivot means connecting the first link to the support for pivotal motion;
    a second link;
    second pivot means connecting the second link to the support for pivotal motion, the second pivot means being disposed a first distance from the first pivot means;
    a third link;
    third pivot means connecting the third link to the first link for relative pivotal motion a distance from the first pivot means of about one half said first distance;
    fourth pivot means connecting the third link for relative pivotal motion to the second link a distance from said second pivot means of about 1.25 times said first distance;
    said fourth pivot means being connected to the third link a distance from the third pivot means of about 1.25 times said first distance;
    a controlled member, and means pivotally connecting the controlled member to the third link a distance of about 1.25 times said first distance from the fourth pivot means;
    a fourth link;

fifth pivot means connecting the fourth link to the support for pivotal motion, the fifth pivot means being disposed said first distance from the second pivot means;

a fifth link;

a sixth link having one end pivotally connected to the support, said first distance from the first link; and a sixth link;

cam means connected to the first link and the sixth link such that as the sixth link is being rotated, the controlled member is moved horizontally along a generally linear path, and then lowered vertically a predetermined distance.

14. A straight-line linkage mechanism as defined in claim 13, in which the controlled member is moved in a vertical motion, returned horizontally along said horizontal path and then lowered in a second vertical motion, as the sixth link is rotated in the opposite direction.

15. A lifting mechanism, comprising:

a base;

a first link;

first pivot means connecting the first link to the base for pivotal motion;

a second link;

second pivot means connecting the second link to the base for pivotal motion, the second pivot means being disposed a first distance from the first pivot means;

a third link;

third pivot means connecting the third link to the first link for relative pivotal motion, the third pivot means being located a distance from the first pivot means of about one half of said first distance;

fourth pivot means connecting the third link for relative pivotal motion to the second link, the fourth pivot means being located a distance from the second pivot means of about 1.25 times said first distance;

said fourth pivot means being connected to the third link, and being located a distance from the third pivot means of about 1.25 times said first distance;

a lifted member having a weight on a first side of said base, and means pivotally connecting the lifted member to the third link, a distance of about 1.25 times said first distance from the fourth pivot means;

a fourth link;

fifth pivot means connecting the fourth link to the support for pivotal motion, the fifth pivot means being disposed said first distance from the second pivot means;

a fifth link;

sixth pivot means connecting the fifth link to the support for relative pivotal motion, the sixth pivot means being disposed said first distance from said fifth pivot means;

a sixth link;

seventh pivot means connecting the sixth link to the fourth link a distance from the fifth pivot means of about one half of said first distance, such that the sixth link is movable in parallel relationship with the third link;

eighth pivot means connecting the sixth link for relative pivotal motion to the fifth link, the eighth pivot means being located a distance of about 1.25 times said first distance from said sixth pivot means, said eighth pivot means being connected to the sixth link, and being located a distance of about 1.25 times said first distance from the seventh pivot means, such that the eighth link is movable in parallel motion with the third link;

means pivotally connecting the sixth link to the lifted member a distance of about 1.25 times said first distance from the eighth pivot means; and counter weight means connected to certain of said links on the opposite side of the base as the lifted member to at least partially counter balance the lifted member as it is moved in a vertical motion.

* * * * *